United States Patent
Rangarajan et al.

(10) Patent No.: US 12,130,773 B2
(45) Date of Patent: Oct. 29, 2024

(54) QUALITY OF SERVICE (QOS) CONTROL OF PROCESSOR APPLICATIONS

(71) Applicant: QUALCOMM Incorporated, San Diego, CA (US)

(72) Inventors: Bharat Kumar Rangarajan, Bangalore (IN); Varun Jindal, Patiala (IN)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 18/084,266

(22) Filed: Dec. 19, 2022

(65) Prior Publication Data

US 2024/0202159 A1 Jun. 20, 2024

(51) Int. Cl.
*G06F 12/08* (2016.01)
*G06F 12/0875* (2016.01)
*G06F 15/78* (2006.01)

(52) U.S. Cl.
CPC ...... *G06F 15/7814* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| | | |
|---|---|---|
| 2013/0007413 A1 | 1/2013 | Thomson et al. |
| 2017/0075589 A1 | 3/2017 | Kannan et al. |
| 2017/0212581 A1 | 7/2017 | Park et al. |
| 2017/0277643 A1 | 9/2017 | Zhou |
| 2019/0086982 A1* | 3/2019 | Priyadarshi ........... G06F 1/3206 |
| 2020/0379804 A1 | 12/2020 | Dalmia et al. |

OTHER PUBLICATIONS

International Search Report and Written Opinion—PCT/US2023/081006—ISA/EPO—Mar. 18, 2024.

* cited by examiner

*Primary Examiner* — Scott C Sun
(74) *Attorney, Agent, or Firm* — QUALCOMM Incorporated

(57) ABSTRACT

Aspects of the disclosure are directed to a quality of service (QOS) assignment policy for processor applications in a system on a chip (SoC). In accordance with one aspect, the system on a chip (SoC) includes an applications central processing unit (CPU), wherein the applications CPU comprises a quality of service (QOS) database table configured to list a plurality of QoS metrics associated with a plurality of processor threads, wherein at least one of the plurality of QoS metrics is used to determine a dynamic clock and voltage scaling (DCVS) operating point; a graphics processing unit (GPU) coupled to the applications CPU; and a common interconnection databus coupled to the applications CPU and the GPU.

30 Claims, 4 Drawing Sheets

QUALITY OF SERVICE (QOS) CONTROL OF PROCESSOR APPLICATIONS

TECHNICAL FIELD

This disclosure relates generally to the field of quality of service (QOS), and, in particular, to quality of service (QOS) control of processor applications.

BACKGROUND

A system on a chip (SoC) is a plurality of processing engines (e.g., processing cores) on a single integrated circuit, or chip, which is used in diverse user applications. For example, nearly all user applications implemented by mobile devices (e.g., wireless user devices) are typically implemented using the SoC as the key enabling agent. One critical element in the architecture of a SoC is SoC management, that is, the management and control of a plurality of processor software modules and processor threads (e.g., tasks) which are run in parallel on the plurality of processing engines. For example, the SoC may manage processor software modules and processor threads to optimize digital clock speed by balancing operational throughput and battery energy consumption. Also, the SoC may prioritize processor servicing by assigning a prioritization metric, such as a Quality of Service (QOS) metric, to each user application being executed. Thus, it is desirable to optimize SoC management to improve overall user experience.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a quality of service (QOS) assignment policy for processor applications in a system on a chip (SoC). Accordingly, a system on a chip (SoC), including an applications central processing unit (CPU), wherein the applications CPU includes a quality of service (QOS) database table configured to list a plurality of QoS metrics associated with a plurality of processor threads, wherein at least one of the plurality of QoS metrics is used to determine a dynamic clock and voltage scaling (DCVS) operating point; a graphics processing unit (GPU) coupled to the applications CPU; and a common interconnection databus coupled to the applications CPU and the GPU.

In one example, the system on a chip (SoC) further includes an instantaneous bandwidth (IB) voter configured to select an instantaneous bandwidth (IB) metric based on the at least one of the plurality of QoS metrics. In one example, the system on a chip (SoC) further includes a memory latency governor configured to determine the quality of service (QoS) database table. In one example, the memory latency governor is further configured to determine an instantaneous bandwidth (IB) database table. In one example, the memory latency governor is configured to determine the instantaneous bandwidth (IB) database table based on an instruction executed per cache miss (IPM) metric. In one example, the memory latency governor is configured to determine the instantaneous bandwidth (IB) database table based on a memory stall metric or a memory writeback metric.

In one example, the system on a chip (SoC) further includes a bandwidth (BW) monitor configured to detect bandwidth utilization of the common interconnection databus. In one example, the system on a chip (SoC) further includes an average bandwidth (AB) voter configured to select an average bandwidth (AB) metric based on the detected bandwidth utilization of the common interconnection databus.

In one example, the instantaneous bandwidth (IB) voter is further configured to select the instantaneous bandwidth (IB) metric based on an instantaneous bandwidth (IB) information from the memory latency governor. In one example, the system on a chip (SoC) further includes a dynamic clock and voltage scaling (DCVS) operating point (OP) manager configured to select the dynamic clock and voltage scaling (DCVS) operating point. In one example, the DCVS operating point is one of a digital clock frequency or a hardware dc voltage level. In one example, the DCVS operating point (OP) manager is configured to select the DCVS operating point based on a maximum of a first bandwidth (BW) metric and a second bandwidth (BW) metric.

In one example, the first bandwidth (BW) metric is based on a sum of a plurality of average bandwidth (AB) metrics and the second bandwidth (BW) metric is based on a maximum of a plurality of instantaneous bandwidth (IB) metrics. In one example, each of the plurality of QoS metrics depends on a presence or an absence of a memory latency bound for completing memory access.

Another aspect of the disclosure provides a method for implementing a quality of service (QOS) assignment policy for processor applications, the method including energizing at least one of a plurality of processing engines to execute one of a plurality of processor software modules to determine an average bandwidth (AB) metric; determining an instantaneous bandwidth (IB) metric based on at least one quality of service (QOS) metric; and determining a dynamic clock and voltage scaling (DCVS) operating point for a plurality of processing engines using the average bandwidth (AB) metric and the instantaneous bandwidth (IB) metric.

In one example, the method further includes executing at least one of the plurality of processor software modules using the DCVS operating point for the plurality of processing engines. In one example, the method further includes initializing the at least one of the plurality of processor software modules to initiate a system on a chip (SoC). In one example, the IB metric is based on one of the following: an instruction executed per cache miss (IPM) metric, a memory stall metric, or a memory writeback metric. In one example, the method further includes comparing the IPM metric to a ceiling parameter; comparing the memory stall metric to a floor parameter; and comparing the memory writeback metric to a threshold parameter. In one example, the at least one QoS metric is based on a presence or an absence of a memory latency bound of the at least one of the plurality of processor software modules.

Another aspect of the disclosure provides an apparatus for a quality of service (QoS) assignment policy for processor applications, the apparatus including means for energizing at least one of a plurality of processing engines to execute one of a plurality of processor software modules to determine an average bandwidth (AB) metric; means for determining an instantaneous bandwidth (IB) metric based on at least one quality of service (QOS) metric; and means for determining a dynamic clock and voltage scaling (DCVS) operating point for the plurality of processing engines using the average bandwidth (AB) metric and the instantaneous bandwidth (IB) metric.

In one example, the apparatus further includes means for executing at least one of the plurality of processor software modules using the DCVS operating point for the processing engines. In one example, the apparatus further includes means for initializing the at least one of the plurality of processor software modules to initiate a system on a chip (SoC). In one example, the IB metric is based on one of the following: an instruction executed per cache miss (IPM) metric, a memory stall metric, or a memory writeback metric. In one example, the at least one QoS metric is based on a presence or an absence of a memory latency bound of the at least one of the plurality of processor software modules.

Another aspect of the disclosure provides a non-transitory computer-readable medium storing computer executable code, operable on a device including at least one processor and at least one memory coupled to the at least one processor, wherein the at least one processor is configured to implement a quality of service (QOS) assignment policy for processor applications, the computer executable code including instructions for causing a computer to execute one of a plurality of processor software modules to determine an average bandwidth (AB) metric; instructions for causing the computer to determine an instantaneous bandwidth (IB) metric based on at least one quality of service (QOS) metric; and instructions for causing the computer to determine a dynamic clock and voltage scaling (DCVS) operating point for the plurality of processing engines using the average bandwidth (AB) metric and the instantaneous bandwidth (IB) metric.

In one example, the non-transitory computer-readable medium further includes instructions for causing the computer to execute at least one of the plurality of processor software modules using the DCVS operating point for the plurality of processing engines. In one example, the non-transitory computer-readable medium further includes instructions for causing the computer to initialize the at least one of the plurality of processor software modules to initiate a system on a chip (SoC). In one example, the IB metric is based on one of the following: an instruction executed per cache miss (IPM) metric, a memory stall metric, or a memory writeback metric. In one example, the at least one QoS metric is based on a presence or an absence of a memory latency bound of the at least one of the plurality of processor software modules.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
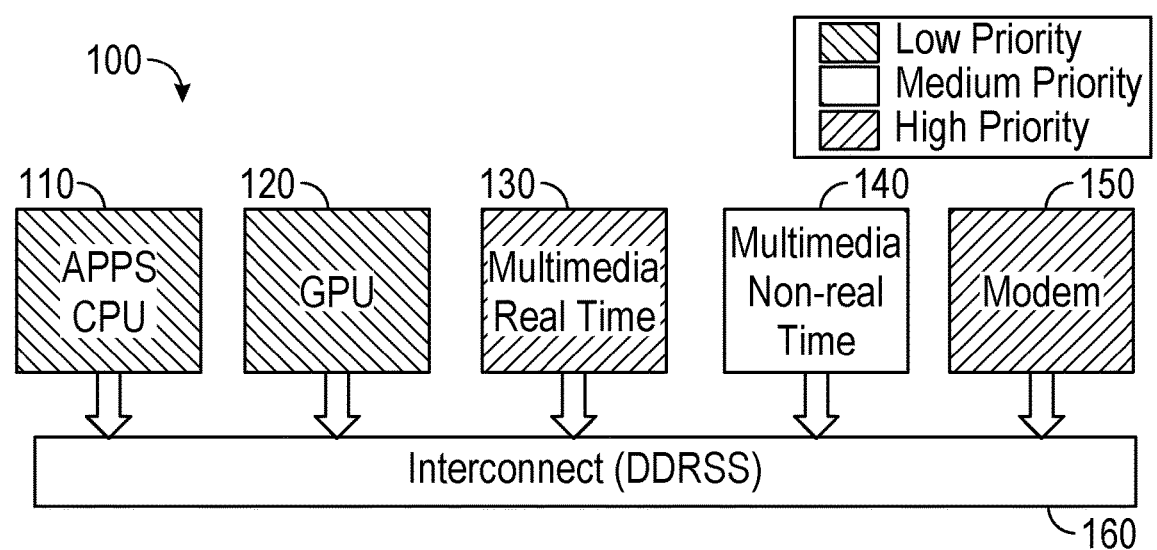
FIG. 1 illustrates an example high-level architectural view of a system on a chip 100 (SoC) with a plurality of processing engines or processing cores.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A system on a chip (SoC) may be the basic agent for execution of a plurality of hardware and software functions to execute user applications within an applications platform. For example, the user applications may include mobile communications, computing operations, automotive operations, business operations, scientific and engineering operations, financial operations, transactional operations, educational operations, etc.

In one example, the applications platform may be, for example, a mobile device which hosts the SoC. The SoC may include a plurality of processing engines, or processing cores, implemented (e.g., monolithically) on a single integrated circuit, or chip. Alternatively, the SoC may be implemented on a plurality of integrated circuits which are interconnected.

In one example, the SoC management, that is, the management and control of SoC operations, is an important utility for satisfying a user need. For example, the plurality of processing engines may execute a plurality of processor software modules and processor threads to implement and execute a plurality of user applications. For example, a processor thread is a set of related tasks performed by a processor to achieve a desired function or result.

In one example, the management and control of the plurality of processor software modules and processor threads may need to be coordinated and synchronized to optimize the overall user experience with respect to service attributes such as throughput, latency, availability, energy utilization, etc. In one example, service attributes may define key performance parameters to satisfy a user need.

In one example, latency is an important service attribute which may contribute to the overall user experience. For example, latency is a measure of time delay between two related events. In one example, latency in a communications scenario may be a measure of time delay (e.g., propagation delay) between transmission of a message from a source node to reception of the message by a destination node, for example, due to the finite propagation speed (e.g., speed of light). In one example, latency in a memory access read scenario may be a measure of time delay between a memory read request operation to a memory data retrieval operation (i.e., a read from memory operation). Alternatively, latency in a memory access write scenario may be a measure of time delay between a memory write request operation to a memory data storage operation (i.e., a write to memory operation).

In one example, latency may have different significance among different user applications. For example, latency may be a critical service attribute for real time applications, such as video streaming, live audio broadcasts, financial market status, etc. For example, certain applications, denoted here as latency-sensitive applications, may require a latency bound, that is, a maximum time delay for execution. On the other hand, for example, latency may not be a critical service attribute for non-real time applications such as archival service, database retrieval, graphics rendering, etc. For example, other applications, denoted here as latency-insensitive applications, may not require a latency bound. Thus, for example, SoC management may classify user applications as being either latency-sensitive or latency-insensitive and may manage and control the user applications accordingly.

For example, one mechanism for the management and control of the plurality of processor software modules and processor threads is a quality of service (QOS) management. In one example, a QoS metric may be assigned to a processor thread or task to designate a priority value (i.e., a desired service provisioning in terms of prioritization) as a priority management policy or a QoS assignment policy. In one example, the QoS metric may be mapped to a numeric value which denotes a priority value for the processor thread. For example, a QoS metric of P0 may map to a priority value of 0, P1 may map to a priority value of 1, P2 may map to a priority value of 2, etc. For example, a lower priority value denotes a lower priority for the processor thread. That is, P0 may map to the lowest priority, P1 may map to the second lowest priority, P2 may map to the third lowest priority, etc. In one example, the QoS metric may designate a traffic priority among multiple clients which access a common interconnection databus.

In one example, different application use cases may illustrate the need for further improvement of the user experience with respect to priority management policy for processor threads. For example, a use case is a scenario for a desired user application.

In a first use case example, a multimedia application in a low-cost mobile device may have limited processing resources. For example, a portion of the multimedia application which is normally executed on a dedicated hardware processing engine may be offloaded to be executed on a generic central processing unit (CPU) to minimize hardware costs (i.e., minimizing usage of dedicated hardware processing engines). In one example, the offloaded portion may be executed on the generic CPU with a low priority value (e.g., QoS metric of P0 or P1) instead of a normal QoS metric having a higher priority value (e.g., QoS metric of P3 or higher). In one example, the user experience would be improved in this first use case example if its QoS metric were assigned to a higher priority value.

In a second use case example, a processor workload may have a latency bound, that is, a processor thread must be completed in a time no greater than a designated latency bound value. That is, the processor thread may be a latency-sensitive application. For example, a QoS metric with a higher priority value may decrease memory latency, which is one component of overall latency. For example, a linked-list traversal (i.e., a memory access over a sequentially linked data structure) may have a high memory latency if its QoS priority value were lower than desired. In one example, if the linked-list utilized randomized memory addresses for its allocated nodes, most of the memory accesses may result in a cache memory miss (i.e., inability to access faster local memory) and result in a memory access to main memory (e.g., DDR memory). In one example, the user experience would be improved in this second use case example if its QoS metric were assigned to a higher priority value.

FIG. 1 illustrates an example high-level architectural view of a system on a chip 100 (SoC) with a plurality of processing engines or processing cores. For example, the SoC 100 includes an applications CPU 110, a graphics processing unit (GPU) 120, a multimedia real time processor 130, a multimedia non-real time processor 140, and a modem 150. In one example, the plurality of processing engines is interconnected via a common interconnection databus 160 (e.g., a dual data rate subsystem (DDRSS) databus).

For example, the SoC 100 may also interface with other elements (not shown) such as cache memory, flash memory, main memory, random access memory (RAM), read only memory (ROM), programmable read only memory (PROM), bulk storage, etc. In one example, the cache memory is used as a local memory with high-speed access. For example, the cache memory may have a plurality of levels (e.g., L1, L2, L3, etc.). For example, the main memory may be the RAM. In one example, the RAM may be a dual data rate (DDR) memory. For example, the common interconnection databus 160 is connected to a memory controller which controls access to the main memory by the plurality of processing cores.

In one example, the multimedia real time processor 130 and the modem 150 may be assigned a high priority value, the multimedia non-real time processor 140 may be assigned a medium priority value and the applications CPU 110 and the graphics processing unit 120 may be assigned a low priority value. In one example, the SoC may include a quantity of priority values of 8 or higher.

In one example the applications CPU 110 may be assigned a low priority value (e.g., P0 or P1) with average low latency for a variety of SoCs (e.g., for mobile communications, computing operations, automotive operations, etc.). For example, the low priority value may be assigned to the applications CPU 110 for all of its use cases and/or applications.

For example, a generic SoC with memory partitioning and monitoring functionality may need to prioritize processor servicing by assigning a prioritization metric, such as Quality of Service (QOS) metric to each application being executed to improve overall user experience. For example, a generic SoC with a coherent hub interface (CHI) may attain better performance with the addition of QoS assignment policy. In one example, the coherent hub interface is an advanced interconnection databus protocol specification.

Figure 2:
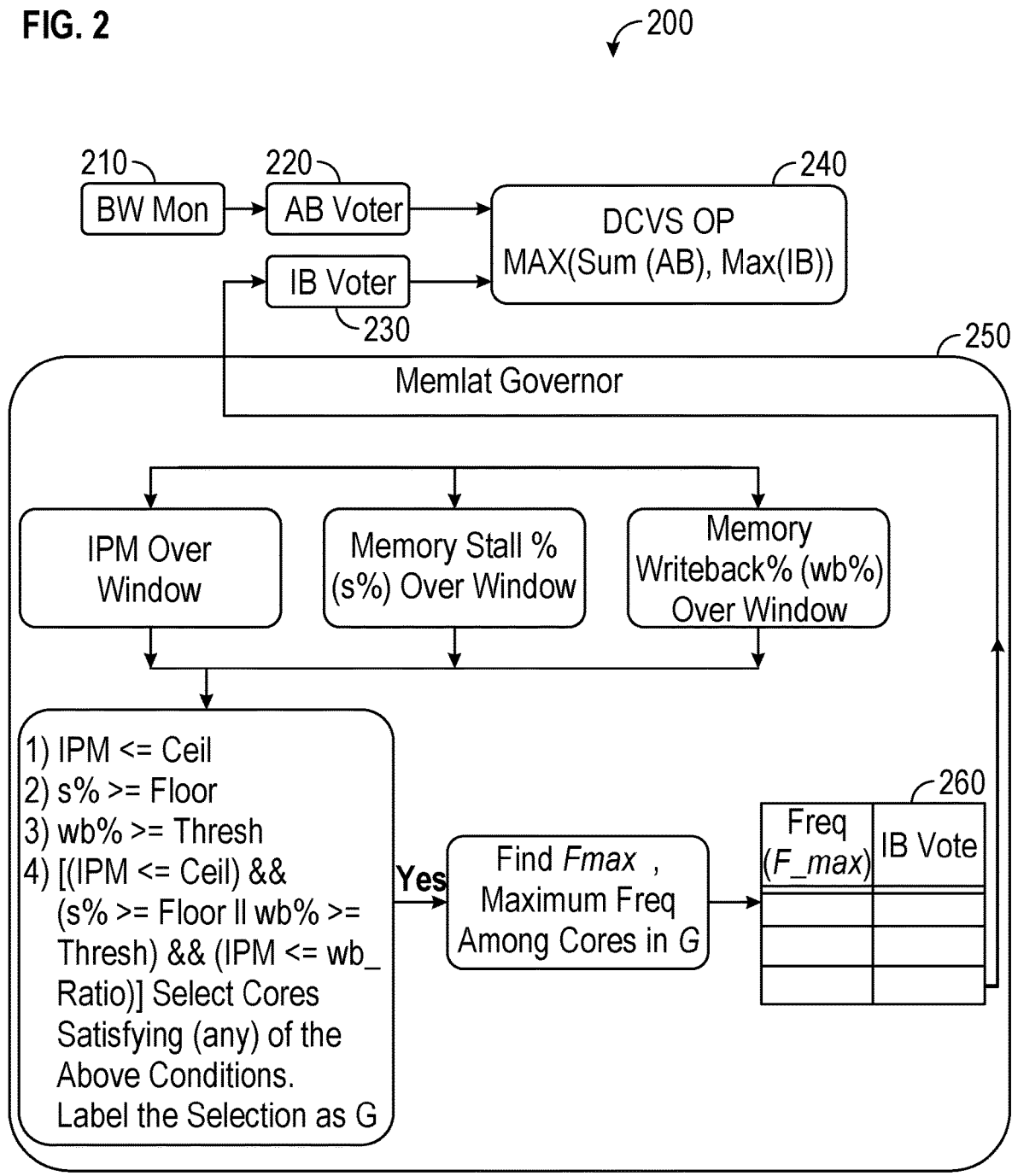
FIG. 2 illustrates an example system on a chip (SoC) architecture with dynamic clock and voltage scaling (DCVS).

FIG. 2 illustrates an example system on a chip (SoC) architecture 200 with dynamic clock and voltage scaling (DCVS). In one example, DCVS is an operational process for varying digital clock frequency and/or hardware dc voltage levels for overall performance and energy management of the SoC.

For example, the SoC architecture in FIG. 2 includes a bandwidth (BW) monitor 210, an average bandwidth (AB) voter 220, an instantaneous bandwidth (IB) voter 230, a dynamic clock and voltage scaling (DCVS) operating point (OP) manager 240, and a memory latency (Memlat) governor 250. In one example, the BW monitor 210 detects bandwidth utilization (e.g., quantity of memory accesses per digital clock cycle) of the common interconnection databus and the AB voter 220 selects an average bandwidth (AB) metric based on the detected bandwidth utilization of the common interconnection databus. In one example, the IB voter 230 selects an instantaneous bandwidth (IB) metric based on instantaneous bandwidth (IB) information from the Memlat governor 250. For example, the AB metric and the IB metric are provided as inputs to the DCVS OP manager 240 to select a dynamic clock and voltage scaling (DCVS) operating point (i.e., digital clock frequency and hardware dc voltage level). In one example, the DCVS operating point is selected based on the maximum of a first bandwidth (BW) metric and a second bandwidth (BW) metric. For example, the first BW metric is based on a sum of a plurality of AB metrics and the second BW metric is based on a maximum of a plurality of IB metrics.

In one example, the Memlat governor 250 provides IB information in a IB database table 260 which lists a plurality of IB values indexed to a plurality of maximum clock frequencies. For example, the Memlat governor 250 determines the IB database table 260 based on an IPM metric, a memory stall metric and a memory writeback metric. In one example, the IPM metric is based on a quantity of instructions executed per cache miss (IPM). For example, a cache miss is an attempt to perform a memory access to cache memory using a memory address where the attempt is unsuccessful (i.e., a cache miss is due to a lack of the memory address in the cache memory). In one example, the cache miss may result in a memory access to RAM or other memory which causes a greater latency than with a memory access to cache memory. For example, the IPM metric may be computed over a first time window.

In one example, the memory stall metric may be determined by a computed statistic on memory stall performance over a second time window. In one example, the memory writeback metric may be determined by a computed statistic on memory writeback performance over a third time window. For example, memory stall performance relates to processor pipeline stall events due to loads or stores to a memory which result in a cache miss. For example, memory writeback performance relates to event counting of data writeback from cache memory to main memory (e.g., DDR memory).

In one example, a selection of processing engines or processing cores, denoted as selected cores, may be based a plurality of logical tests using the IPM metric, the memory stall metric and the memory writeback metric. For example, the selected cores may be selected if the IPM metric is less than or equal to a ceiling parameter, if the memory stall metric is greater than or equal to a floor parameter, if the memory writeback metric is greater than or equal to a threshold parameter, or if the IPM metric is less than or equal to a writeback ratio. For example, after selection of the selected cores, the Memlat governor 250 may determine a maximum clock frequency F_max among all the processing engines of the selected cores. In one example, the maximum clock frequency is the maximum clock frequency for the IB database table 260. In one example, the ceiling parameter, the floor parameter, and the threshold parameter are system constant values which are based on software workload behavior.

In one example, the Memlat governor 250 determines the IB database table 260 when latency bound workloads are executed in the SoC. For example, the IB database table 260 is based on the digital clock frequency of the applications CPU 110 (as shown in FIG. 1). For example, the DCVS operating point of the common interconnection databus 160 (as shown in FIG. 1) is based on the AB metric and the IB metric.

In one example, SoC performance may be constrained by a conservative or static priority management policy. For example, the applications CPU 110 (as shown in FIG. 1) may be assigned a low priority value (e.g., P0 or P1) due to concurrent use cases in the SoC. In one example, existing QoS assignment policies may not be enabled in processor software modules or may be unduly conservative in their implementation.

Figure 3:
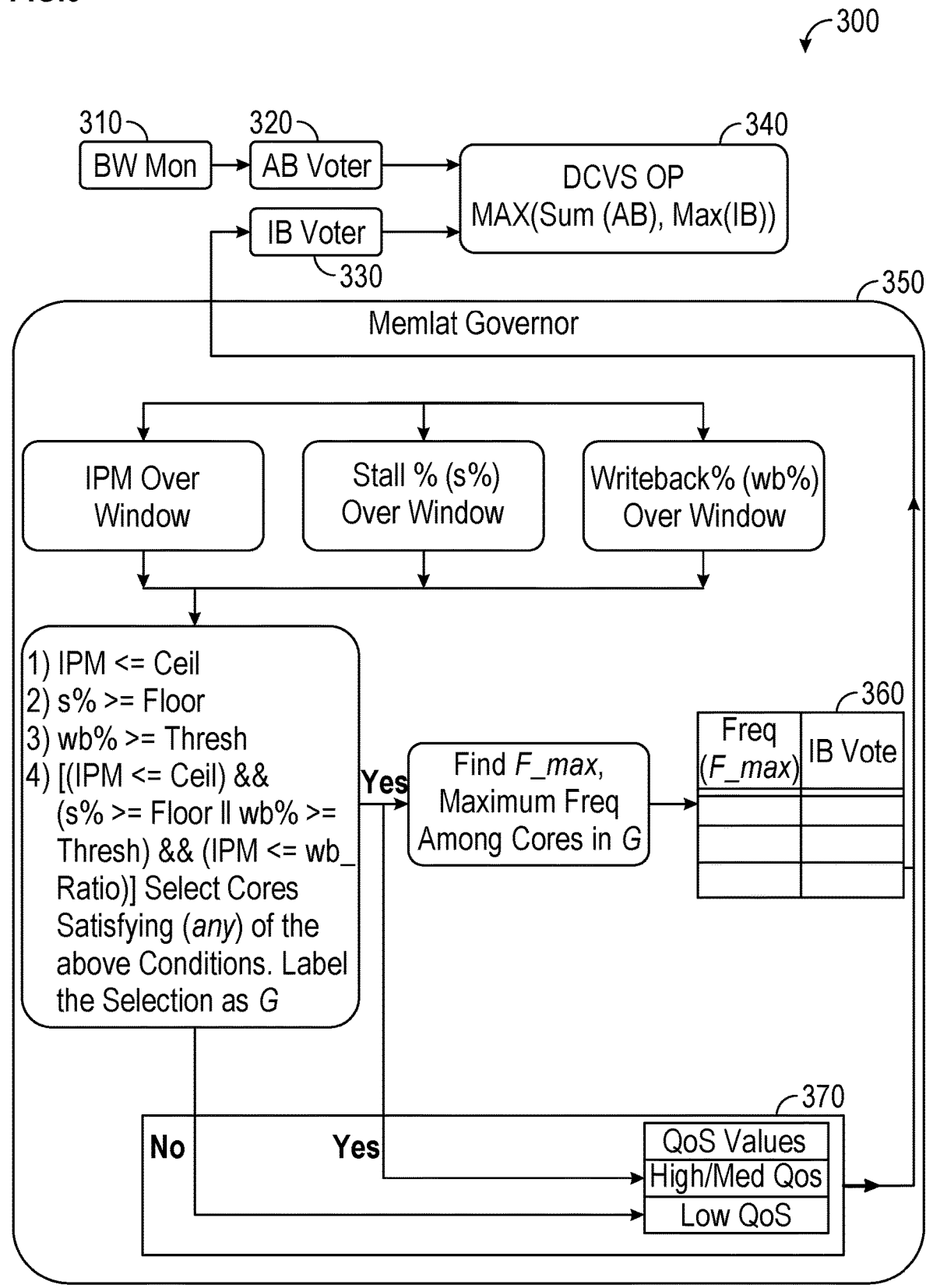
FIG. 3 illustrates an example system on a chip (SoC) architecture with dynamic clock and voltage scaling (DCVS) and a quality of service (QOS) assignment policy.

FIG. 3 illustrates an example system on a chip (SoC) architecture 300 with dynamic clock and voltage scaling (DCVS) and a quality of service (QOS) assignment policy. In one example, DCVS is an operational process for varying digital clock frequency and/or hardware dc voltage levels for overall performance and energy management of the SoC.

In one example, the SoC architecture in FIG. 3 includes a bandwidth (BW) monitor 310, an average bandwidth (AB) voter 320, an instantaneous bandwidth (IB) voter 330, a dynamic clock and voltage scaling (DCVS) operating point (OP) manager 340, and a memory latency (Memlat) governor 350. In one example, the BW monitor 310 detects bandwidth utilization (e.g., quantity of memory accesses per digital clock cycle) of the common interconnection databus and the AB voter 320 selects an average bandwidth (AB) metric based on the detected bandwidth utilization of the common interconnection databus. In one example, the IB voter 330 selects an instantaneous bandwidth (IB) metric based on instantaneous bandwidth (IB) information from the Memlat governor 350. For example, the AB metric and the IB metric are provided as inputs to the DCVS OP manager 340 to select a dynamic clock and voltage scaling (DCVS) operating point (i.e., digital clock frequency and hardware dc voltage level). In one example, the DCVS operating point is selected based on the maximum of a first bandwidth (BW) metric and a second bandwidth (BW) metric. For example, the first BW metric is based on a sum of a plurality of AB metrics and the second BW metric is based on a maximum of a plurality of IB metrics.

In one example, the Memlat governor 350 provides IB information in a IB database table 360 which lists a plurality of IB values indexed to a plurality of maximum clock frequencies. For example, the Memlat governor 350 determines the IB database table 360 based on an IPM metric, a memory stall metric and a memory writeback metric. In one example, the IPM metric is based on a quantity of instructions executed per cache miss (IPM). For example, a cache miss is an attempt to perform a memory access to cache memory using a memory address where the attempt is unsuccessful (i.e., a cache miss is due to a lack of the memory address in the cache memory). In one example, the cache miss may result in a memory access to RAM or other memory which causes a greater latency than with a memory access to cache memory. For example, the IPM metric may be computed over a first time window.

Regarding FIG. 3, in one example, the memory stall metric may be determined by a computed statistic on memory stall performance over a second time window. In one example, the memory writeback metric may be determined by a computed statistic on memory writeback performance over a third time window. For example, memory stall performance relates to processor pipeline stall events due to loads or stores to a memory which result in a cache miss. For example, memory writeback performance relates to event counting of data writeback from cache memory to main memory (e.g., DDR memory).

Regarding FIG. 3, in one example, a selection of processing engines or processing cores, denoted as selected cores, may be based a plurality of logical tests using the IPM metric, the memory stall metric and the memory writeback metric. For example, the selected cores may be selected if the IPM metric is less than or equal to a ceiling parameter, if the memory stall metric is greater than or equal to a floor parameter, if the memory writeback metric is greater than or equal to a threshold parameter, or if the IPM metric is less than or equal to a writeback ratio. For example, after selection of the selected cores, the Memlat governor 350 may determine a maximum clock frequency F_max among all processing engines of the selected cores. In one example, the maximum clock frequency is the maximum clock frequency for the IB database table 360. In one example, the ceiling parameter, the floor parameter, and the threshold parameter are system constant values which are based on software workload behavior.

In one example, the Memlat governor 350 determines the IB database table 360 when latency bound workloads are executed in the SoC. For example, the IB database table 360 is based on the digital clock frequency of the applications CPU 110 (as shown in FIG. 1). For example, the DCVS operating point of the common interconnection databus 160 (as shown in FIG. 1) is based on the AB metric and the IB metric.

In one example, SoC performance may be constrained by a conservative or static priority management policy. For example, the applications CPU 110 (as shown in FIG. 1) may be assigned a low priority value (e.g., P0 or P1) due to concurrent use cases in the SoC. In one example, existing QoS assignment policies may not be enabled in processor software modules or may be unduly conservative in their implementation.

In one example, FIG. 3 is an extension of FIG. 2 with the addition of a quality of service (QOS) database table 370 which lists a plurality of QoS metrics for a plurality of processor threads which depend on a presence or absence of a memory latency bound for each processor thread.

In one example, a memory latency bound is a designated memory access latency bound value, where a memory access must be completed in a time no greater than the designated memory access latency bound value. That is, the memory latency bound is a maximum allowed memory access delay time. For example, a particular processor thread may or may not have a memory latency bound. For example, a multimedia real time processor thread or a modem processor thread may have a memory latency bound as part of its overall latency requirement. For example, certain applications processes may not have a memory latency bound or an overall latency requirement (e.g., a background task without a specific time constraint). In one example, the SoC may execute a QoS assignment policy which applies a QoS metric for each processor thread. In one example, the IB metric is determined based on at least one QoS metric selected by the IB voter 330.

In one example, the QoS assignment policy may be combined with a memory partitioning and monitoring (MPAM) functionality to apply a QoS metric for each processor thread.

In one example, the QoS assignment policy which is applied is common across all the threads/cores and hence will have all threads competing with same priority level even though only a smaller number of threads may be executing a memory latency bound. In another example, the QoS assignment policy may be selectively applied to each of the threads by combining memlat governor and MPAM functionality.

In one example, the MPAM architecture provides a method for assigning priority (QoS) values for each of the threads executing in a processor (e.g., applications CPU 110). The assigned priority values are then used by the downstream buses to arbitrate between the memory transactions from all of the CPU threads. The MPAM architecture assigns the priority values for each thread based on some known information such as, foreground threads to have higher priority over background threads or real time multimedia threads to have higher priority over non real time multimedia threads.

In one example, combining memlat governor based QoS assignment policy with MPAM functionality, provides a method for the MPAM architecture to dynamically identify a memory latency bound transaction window within a thread (for example, a foreground task may have only small window of transactions which are memory latency bound) and assign priority values accordingly.

1) If any of the threads, (e.g., thread1) execute a memory latency bound transactions in a particular window of the thread, the MPAM architecture may assign a higher QoS priority for that window of the thread alone without changing the priority values of the other threads.
2) If, for example, thread1 executes a non memory latency bound transaction, then the MPAM architecture may revert the priority value of this thread.
3) If none of the threads execute a memory latency bound workload, the MPAM architecture may assign a lower QoS priority to all the threads and hence all the memory transactions originating from Application CPU will be of lower priority.

Figure 4:
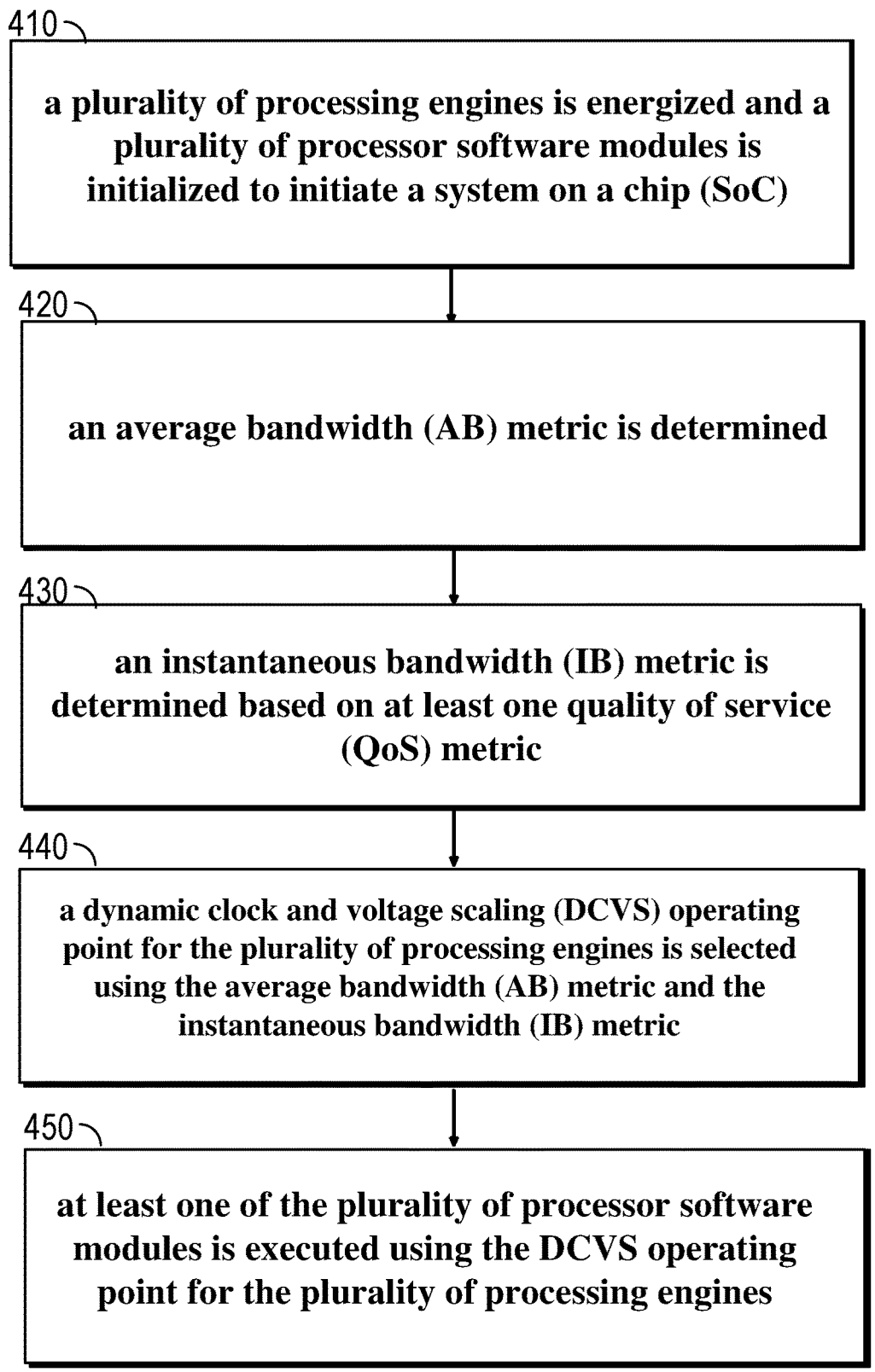
FIG. 4 illustrates an example flow diagram for implementing a quality of service (QoS) assignment policy for processor applications.

FIG. 4 illustrates an example flow diagram 400 for implementing a quality of service (QOS) assignment policy for processor applications. In one example, the QoS assignment policy operates on a system on a chip (SoC). For example, the SoC includes a plurality of processing engines (e.g., processing cores). For example, the SoC includes a plurality of processor software modules and processor threads which are executed by the plurality of processing engines to implement a plurality of user applications.

In block 410, a plurality of processing engines is energized and a plurality of processor software modules is initialized to initiate a system on a chip (SoC). In one example, the plurality of processing engines is energized when dc power is applied to the plurality of processing engines, for example, using a dc power circuit. In one example, the plurality of processor software modules is initialized by setting software parameters to particular values. In one example, the SoC is initiated after the plurality of processing engines is energized and the plurality of software modules is initialized. In one example, the initialization of the plurality of processor software modules is performed by an operating system.

In one example, the plurality of processing engines includes an applications central processing unit (CPU). In one example, the plurality of processor software modules includes a first subset of processor software modules which have a latency requirement. In one example, the latency requirement is a set of latency bounds. For example, the plurality of processor software modules may include a second subset of processor software modules which do not have a latency requirement. In one example, the plurality of processor software modules includes a plurality of processor threads.

In block 420, an average bandwidth (AB) metric is determined, following an initiated system on a chip (SoC). In one example, the AB metric is based on a detected bandwidth utilization of the common interconnection databus. For example, the detected bandwidth utilization of the common interconnection databus is based on data throughput on a common interconnection databus which interconnects the plurality of processing engines. In one example, the bandwidth utilization of the common interconnection databus is detected by a bandwidth monitor.

In block 430, an instantaneous bandwidth (IB) metric is determined based on at least one quality of service (QOS) metric. In one example, the IB metric is based on an instruction executed per cache miss (IPM) metric. In one example, the IB metric is based on a memory stall metric. In one example, the IB metric is based on a memory writeback metric. For example, the IPM metric is compared to a ceiling parameter. For example, the memory stall metric maybe compared to a floor parameter. For example, the memory writeback parameter is compared to a threshold parameter. In one example, the ceiling parameter, the floor parameter and the threshold parameter are initialized after the SoC is initiated.

In one example, the IB metric is based on at least one QoS metric from the QoS database table. For example, the QoS database table lists a plurality of QOS metrics for a plurality of processor software modules which depend on a presence or absence of a memory latency bound for each software module. For example, a memory latency bound is a designated memory access latency bound value, where a memory access must be completed in a time no greater than the designated latency bound value. In one example, the SoC may execute a QoS assignment policy which applies a QoS metric for each processor thread.

In one example, a selection of processing engines or processing cores, denoted as selected cores, may be based on a plurality of logical tests using the IPM metric, the memory stall metric and/or the memory writeback metric. For example, the selected cores may be selected if the IPM metric is less than a ceiling parameter, if the memory stall metric is greater than a floor parameter, if the memory writeback metric is greater than a threshold parameter, and if the IPM metric is less than a writeback ratio. For example, after selection of the selected cores, the Memlat governor (e.g., Memlat governor 250, 350) may determine a maximum clock frequency F_max among all processing engines of the selected cores. In one example, the set of maximum clock frequencies is the plurality of maximum clock frequencies for the IB database table (e.g., IB database table 260, 360). In one example, the ceiling parameter, the floor parameter, and the threshold parameter are system constant values which are based on software workload behavior.

In block 440, a dynamic clock and voltage scaling (DCVS) operating point for the plurality of processing engines is selected using the average bandwidth (AB) metric and the instantaneous bandwidth (IB) metric. In one example, the DCVS operating point is based on a plurality of QoS metrics as part of the IB metric. For example, each QoS metric may be assigned to a processor thread to designate a priority value for that processor thread. In one example, the priority value may be designated as HIGH or LOW. In another example, the priority value may be designated as HIGH, MEDIUM or LOW. In another example, the priority value may be designated with a numeric value such as P0, P1, P2, P3, etc.

In block 450, at least one of the plurality of processor software modules is executed using the DCVS operating point for the plurality of processing engines. In one example, each processor thread of the plurality of processor software modules is executed with a priority designated by a QoS metric from the plurality of QOS metrics. In one example, the selected DCVS operating point is the operating point of the SoC, including the common interconnect databus, memory controller and main memory.

In one aspect, one or more of the steps in FIG. 4 may be executed by one or more processors which may include hardware, software, firmware, etc. The one or more processors, for example, may be used to execute software or firmware needed to perform the steps in the flow diagram of FIG. 4. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. A system on a chip (SoC), comprising:
   an applications central processing unit (CPU), wherein the applications CPU comprises a quality of service (QOS) database table configured to list a plurality of QoS metrics associated with a plurality of processor threads, wherein at least one of the plurality of QoS metrics is used to determine a dynamic clock and voltage scaling (DCVS) operating point;
   a graphics processing unit (GPU) coupled to the applications CPU; and
   a common interconnection databus coupled to the applications CPU and the GPU.

2. The system on a chip (SoC) of claim 1, further comprising an instantaneous bandwidth (IB) voter configured to select an instantaneous bandwidth (IB) metric based on the at least one of the plurality of QoS metrics.

3. The system on a chip (SoC) of claim 2, further comprising a memory latency governor configured to determine the quality of service (QOS) database table.

4. The system on a chip (SoC) of claim 3, wherein the memory latency governor is further configured to determine an instantaneous bandwidth (IB) database table.

5. The system on a chip (SoC) of claim 4, wherein the memory latency governor is configured to determine the instantaneous bandwidth (IB) database table based on an instruction executed per cache miss (IPM) metric.

6. The system on a chip (SoC) of claim 4, wherein the memory latency governor is configured to determine the instantaneous bandwidth (IB) database table based on a memory stall metric or a memory writeback metric.

7. The system on a chip (SoC) of claim 4, further comprising a bandwidth (BW) monitor configured to detect bandwidth utilization of the common interconnection databus.

8. The system on a chip (SoC) of claim 7, further comprising an average bandwidth (AB) voter configured to select an average bandwidth (AB) metric based on the detected bandwidth utilization of the common interconnection databus.

9. The system on a chip (SoC) of claim 8, wherein the instantaneous bandwidth (IB) voter is further configured to select the instantaneous bandwidth (IB) metric based on an instantaneous bandwidth (IB) information from the memory latency governor.

10. The system on a chip (SoC) of claim 9, further comprising a dynamic clock and voltage scaling (DCVS) operating point (OP) manager configured to select the dynamic clock and voltage scaling (DCVS) operating point.

11. The system on a chip (SoC) of claim 10, wherein the DCVS operating point is one of a digital clock frequency or a hardware dc voltage level.

12. The system on a chip (SoC) of claim 10, wherein the DCVS operating point (OP) manager is configured to select the DCVS operating point based on a maximum of a first bandwidth (BW) metric and a second bandwidth (BW) metric.

13. The system on a chip (SoC) of claim 12, wherein the first bandwidth (BW) metric is based on a sum of a plurality of average bandwidth (AB) metrics and the second bandwidth (BW) metric is based on a maximum of a plurality of instantaneous bandwidth (IB) metrics.

14. The system on a chip (SoC) of claim 1, wherein each of the plurality of QOS metrics depends on a presence or an absence of a memory latency bound for completing memory access.

15. A method for implementing a quality of service (QOS) assignment policy for processor applications, the method comprising:
energizing at least one of a plurality of processing engines to execute one of a plurality of processor software modules to determine an average bandwidth (AB) metric;
determining an instantaneous bandwidth (IB) metric based on at least one quality of service (QOS) metric; and
determining a dynamic clock and voltage scaling (DCVS) operating point for the plurality of processing engines using the average bandwidth (AB) metric and the instantaneous bandwidth (IB) metric.

16. The method of claim 15, further comprising:
executing at least one of the plurality of processor software modules using the DCVS operating point for the plurality of processing engines.

17. The method of claim 16, further comprising:
initializing the at least one of the plurality of processor software modules to initiate a system on a chip (SoC).

18. The method of claim 16, wherein the IB metric is based on one of the following: an instruction executed per cache miss (IPM) metric, a memory stall metric, or a memory writeback metric.

19. The method of claim 18, further comprising:
comparing the IPM metric to a ceiling parameter;
comparing the memory stall metric to a floor parameter; and
comparing the memory writeback metric to a threshold parameter.

20. The method of claim 15, wherein the at least one QoS metric is based on a presence or an absence of a memory latency bound of the at least one of the plurality of processor software modules.

21. An apparatus for a quality of service (QOS) assignment policy for processor applications, the apparatus comprising:
means for energizing at least one of a plurality of processing engines to execute one of a plurality of processor software modules to determine an average bandwidth (AB) metric;
means for determining an instantaneous bandwidth (IB) metric based on at least one quality of service (QOS) metric; and
means for determining a dynamic clock and voltage scaling (DCVS) operating point for the plurality of processing engines using the average bandwidth (AB) metric and the instantaneous bandwidth (IB) metric.

22. The apparatus of claim 21, further comprising:
means for executing at least one of the plurality of processor software modules using the DCVS operating point for the plurality of processing engines.

23. The apparatus of claim 22, further comprising:
means for initializing the at least one of the plurality of processor software modules to initiate a system on a chip (SoC).

24. The apparatus of claim 22, wherein the IB metric is based on one of the following: an instruction executed per cache miss (IPM) metric, a memory stall metric, or a memory writeback metric.

25. The apparatus of claim 21, wherein the at least one QoS metric is based on a presence or an absence of a memory latency bound of the at least one of the plurality of processor software modules.

26. A non-transitory computer-readable medium storing computer executable code, operable on a device comprising at least one processor and at least one memory coupled to the at least one processor, wherein the at least one processor is configured to implement a quality of service (QOS) assignment policy for processor applications, the computer executable code comprising:
instructions for causing a computer to execute one of a plurality of processor software modules to determine an average bandwidth (AB) metric;
instructions for causing the computer to determine an instantaneous bandwidth (IB) metric based on at least one quality of service (QOS) metric; and
instructions for causing the computer to determine a dynamic clock and voltage scaling (DCVS) operating point for a plurality of processing engines using the average bandwidth (AB) metric and the instantaneous bandwidth (IB) metric.

27. The non-transitory computer-readable medium of claim 26, further comprising instructions for causing the computer to execute at least one of the plurality of processor software modules using the DCVS operating point for the plurality of processing engines.

28. The non-transitory computer-readable medium of claim 27, further comprising instructions for causing the computer to initialize the at least one of the plurality of processor software modules to initiate a system on a chip (SoC).

29. The non-transitory computer-readable medium of claim 27, wherein the IB metric is based on one of the following: an instruction executed per cache miss (IPM) metric, a memory stall metric, or a memory writeback metric.

30. The non-transitory computer-readable medium of claim 26, wherein the at least one QoS metric is based on a presence or an absence of a memory latency bound of the at least one of the plurality of processor software modules.

* * * * *